1,041,641
D. L. LINDQUIST.
BRAKE MAGNET PROTECTIVE AND DEMAGNETIZING DEVICE.
APPLICATION FILED MAR. 10, 1909.
1,041,641. Patented Oct. 15, 1912.
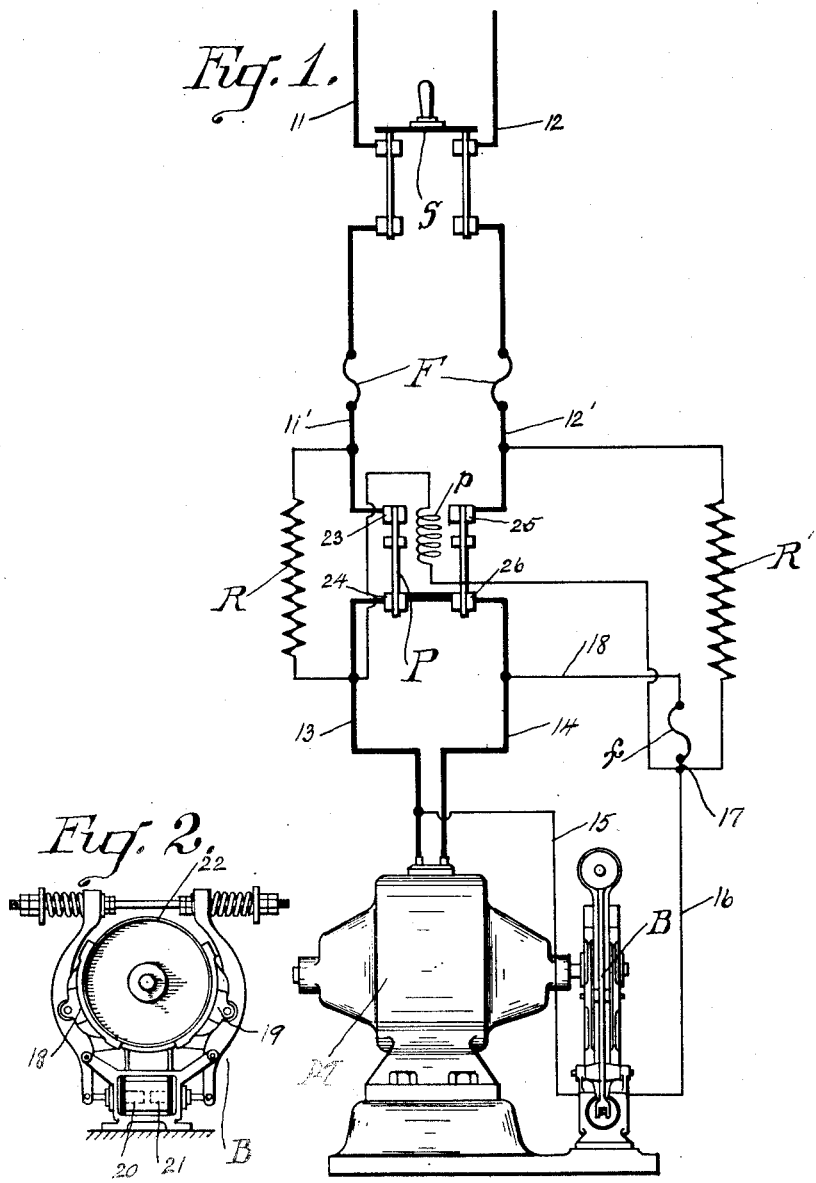

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

BRAKE-MAGNET PROTECTIVE AND DEMAGNETIZING DEVICE.

1,041,641.  Specification of Letters Patent.  Patented Oct. 15, 1912.

Application filed March 10, 1909. Serial No. 482,614.

*To all whom it may concern:*

Be it known that I, DAVID L. LINDQUIST, a subject of the King of Sweden, residing at Yonkers, in the county of Westchester and State of New York, have invented a new and useful Improvement in Brake-Magnet Protective and Demagnetizing Devices, of which the following is a specification.

My invention relates to the protecting and the demagnetizing of an inductive device, and is herein more particularly designated and described as an arrangement for protecting an alternating current magnet.

One of the objects of my invention is to prevent too much current from being supplied to the brake magnet winding and thereby causing the burning out of the magnet coils.

A further object is to prevent the operation of the brake magnet in case the line voltage is too low.

A still further object is to provide means for demagnetizing the brake magnet.

For the attainment of these ends and the accomplishment of other useful objects, my invention consists in the features of novelty in the combination and arrangement of the several parts hereinafter more completely described and claimed in the appended claims.

In the accompanying drawing, Figure 1 shows my invention as applied to a single phase alternating current motor; Fig. 2 is a side view of the brake shown in Fig. 1.

The present embodiment of my invention is described as a single phase installation, but the invention may be applied to a polyphase arrangement of any number of phases. The motor M is supplied with current from the mains 11, 12, through the main switch S, the main fuses F, means 11' and 12', the potential switch P, and the motor leads 13 and 14. Main line fuses F are for the purpose of protecting the motor M and the brake B, in the ordinary well known manner from too great a current and from too high a voltage.

The brake B is of the ordinary type wherein the cores 20, 21 come together to release the shoes 18, 19 from the pulley 22 when the brake magnet is energized; and as the air gap between the said cores is closed, the current in the brake magnet winding decreases until the said cores reach a stationary position, as in the ordinary well known manner.

The circuit through the brake magnet winding is traced from the motor lead 13, through wire 15, thence through the brake magnet winding, wires 16, 17, fuse *f*, and wire 18, to the other motor lead 14.

The operating or potential switch P shown diagrammatically is of a type that is manually closed, and thereafter held in position against the action of a releasing spring, by the magnetic action of current flowing through the coil *p*; if the circuit is broken, the spring operates to open the switch. The terminals of the potential switch coil *p* are connected, one to the motor lead 13 and the other to the junction of the wires 16 and 17, so that the current for the potential switch P must also pass through the fuse *f*.

High resistances or inductances R, R' are placed around the potential switch contacts 23, 24 and 25, 26 respectively, forming a by-pass for supplying current to the brake magnet winding when the potential switch is open; the terminals of the resistance or inductance R are connected to the wire 11' and the motor lead 13, and the terminals of the resistance or inductance R' are connected to the wire 12' and the junction of wires 16 and 17.

This invention operates upon the principle of self-induction, in that the current to the brake magnet is reduced to a minimum as soon as the brake magnet cores come together. The fuse *f* is of sufficient capacity to carry the current ordinarily consumed when the brake magnet is energized and the instantaneous large current consumed while the brake is lifting, but has much less capacity than either of the main line fuses F. This fuse *f* will blow when excessive starting current is caused by too high voltage or by too long an air gap between the magnet cores 20 and 21. The fuse will also blow, if for any reason, the brake magnet refuses to operate to close the airgap when the magnet is energized. As for instance, (1) when the airgap between the magnet cores is so long that the pull of the magnet is insufficient to overcome the load or the resistance; (2) when the load is greater than the magnet can lift; (3) when the line voltage is so low that the pull exerted by the magnet is less than that required to lift the load.

In an ordinary arrangement the brake shoes 18, 19 when repeatedly released, may reach a condition where the airgap of the brake magnet becomes so great that the brake shoes are not released, and therefore the motor armature is held stationary; a large current flows through the brake magnet winding and through the motor, tending thereby to burn out the brake magnet winding and also the motor winding. If, as in my invention, the brake magnet airgap becomes so great that the shoes are not released, current flowing through the fuse $f$ will be sufficient to blow the said fuse and effect the opening of the potential switch to protect the brake magnet winding, thereby protecting the motor also.

The resistances or inductances R and R' are suitably high enough to restrict the passage of current to the brake magnet, and this current is for the purpose of demagnetizing the brake magnet and for assisting in the release of the same by such demagnetization. Only a very small current is required for this demagnetizing action, and this current is by no means sufficient either to hold the brake magnet in its operated position or to retain the potential switch in its closed position. The brake magnet also refuses to operate when the line voltage is too low; even in this case taking sufficient current to blow the fuse $f$. If the line voltage is too high the main fuses F may be relied upon to protect the motor M and the brake B when the potential switch P is closed; and the resistances or inductances R and R' are sufficiently high to protect the brake magnet winding when the potential switch P is open.

It is evident that my invention is applicable to any inductive device, and I desire not to be limited to the exact combination of component parts herein described, nor to any set or fixed arrangement of the same, as it is evident that various changes may be made without interfering with the spirit or scope of my invention.

What I claim and desire to secure by Letters Patent of the United States is:—

1. The combination with an alternating current magnet, of supply mains, a potential or operating switch, and means for demagnetizing the magnet with alternating current from the supply mains when the operating switch is open.

2. The combination with an alternating current magnet, of supply mains, an operating switch which completes an energizing circuit from the supply mains to the magnet when closed, and means whereby a demagnetizing circuit is made effective from the supply mains to the magnet when the operating switch is opened.

3. The combination with an alternating current magnet, of supply mains, an operating switch connecting the magnet winding to the supply mains, high inductance or resistance providing a bypass for current from the mains to the magnet winding when the operating switch is open, whereby the magnet is demagnetized.

4. The combination with an alternating current magnet, of supply mains, an operating or potential switch, a restricted bypass around the potential switch for current when the said switch is open, and means whereby the potential switch is opened when excessive current is taken by the magnet.

5. The combination of an alternating current magnet, means for protecting the magnet form a continuous flow of an excessive current, and a restricted bypass permitting a demagnetizing current to flow to the magnet windings when the protecting means has operated.

6. The combination of an alternating current magnet, an operative potential switch, a potential switch holding coil parallel connected with the brake winding, a fuse carrying the normal current of both windings which blows when excessive current flows in the magnet winding thereby opening the potential switch, and a bypass circuit to the magnet winding containing high resistance or inductance which limits the current flowing therethrough and demagnetizes the magnet.

7. The combination of an alternating current motor, an alternating current brake, a potential switch, high inductance or resistance placed around the potential switch supplying a demagnetizing current circuit to the said brake, and a fuse in the brake circuit suitable for permitting an instantaneous large current to be supplied to the said brake but preventing the continuous flowing of the said large current.

8. The combination of an alternating current motor, an operative switch, high inductance or resistance placed around the operative switch to limit the passage of current when the said switch is open, an inductive brake which takes less current when energized than when actuated, and a fuse in the brake circuits suitable for carrying the ordinary current utilized in operating the brake.

9. The combination of an alternating current motor, an alternating current brake, main fuses, an auxiliary fuse for protecting the brake, a potential switch, and high resistances or inductances fixedly placed to permit current to flow to the said brake when the potential switch is open or closed.

10. The combination of an alternating current motor, an alternating current brake, a potential switch to simultaneously close circuits to the motor and the brake, and means for automatically demagnetizing the brake magnet thereby operating to assist in applying the brake when the potential switch opens.

11. The combination of an alternating current motor, an alternating current brake, a potential switch, high resistances or inductances placed around the potential switch contacts and arranged to permit current to flow to the brake magnet when the potential switch is open.

12. The combination of an alternating current motor, an alternating current brake, a potential switch, main fuses, and resistance or inductance arranged to be in series with the brake magnet winding circuit when the potential switch is open.

13. The combination of an alternating current motor, an alternating current brake, a potential switch, main fuses, an auxiliary fuse connected in series with the potential switch and the brake magnet coils connected in parallel when the potential switch is closed, and high resistance or inductance in series with the said coils in parallel when the potential switch is open.

14. The combination of an alternating current motor, an alternating current brake, a potential switch, main fuses, high inductance or resistance arranged to be in series with the brake magnet when the potential switch is open, and an auxiliary fuse through which the current taken by the brake magnet winding and the potential switch winding normally flows when the potential switch is closed.

15. The combination of an alternating current motor, an alternating current brake, a potential switch, and high resistance or inductance connected in circuit with the brake magnet winding and the potential switch winding in parallel, which permits sufficient current to flow in the brake magnet winding to demagnetize the brake when the potential switch is open.

16. The combination of an alternating current motor, an alternating current brake, an automatic potential switch, main fuses, an auxiliary fuse adapted to carry the ordinary current of the brake and the potential switch when the latter is closed, high inductance or resistance connected around the potential switch which permits a demagnetizing current to flow in the brake magnet winding when the potential switch is open, and a manually operable knife switch for cutting out all current connections to the motor and to the brake.

17. The combination with an alternating current motor, of an alternating current brake magnet, main fuses protecting the motor and the brake magnet, magnet cores normally attracted and brought together when the brake magnet is energized, but requiring a large current to attract them when the cores are far apart, and an auxiliary fuse in the brake magnet circuit which opens when the current taken is too large for the brake magnet winding and which is also designed to open the circuit when the current is insufficient to operate the brake.

18. The combination of an alternating current motor, an alternating current brake, a source of current supply, main fuses, a potential switch closing circuits to the motor and the brake, an additional fuse in the brake winding circuit which opens to prevent too great a current flowing to the brake magnet when the impressed voltage is too low operatively to energize the brake.

19. The combination with an alternating current motor, of an alternating current brake, a switch operative to open and close circuits to the motor and the brake, and means for demagnetizing the brake magnet when the said switch opens the said circuits.

20. The combination of an alternating current motor, an alternating current brake energized when the motor is excited, a potential switch to close circuits to the motor and brake, and means whereby the brake magnet is automatically demagnetized when the potential switch opens.

21. The combination of an alternating current motor, an alternating current brake, main fuses protecting the motor and the brake, movable magnet cores for the brake requiring a large current to move them when far apart and refusing to operate when too far apart, thereby causing a large current to flow in the brake magnet winding, and an auxiliary fuse which opens the circuit which operatively energizes the brake magnet when the current flowing through the fuse is too large and is also adapted to open the circuit when the current is insufficient to operate the brake.

22. The combination of an alternating current motor, an alternating current brake, main fuses protecting both the motor and brake, a potential switch for automatically opening the motor circuit, brake magnet cores normally operative to release the brake when the brake magnet is energized, and an additional fuse connected in series with the potential switch and the brake magnet windings connected in parallel which blows when the magnet cores are prevented from operating, thereby opening the brake circuit and causing the potential switch to open the motor circuit.

In testimony whereof, I have signed my name to this specification in the presence of two subscribing witnesses.

DAVID L. LINDQUIST.

Witnesses:
 Roger W. Flagg,
 Oliver Wilber Doty.